(12) United States Patent
Chaiken et al.

(10) Patent No.: US 12,066,885 B2
(45) Date of Patent: Aug. 20, 2024

(54) COLLECTION OF FORENSIC DATA AFTER A PROCESSOR FREEZE

(71) Applicant: Dell Products L.P., Round Rock, TX (US)

(72) Inventors: Craig L. Chaiken, Pflugerville, TX (US); Balasingh P. Samuel, Round Rock, TX (US); Siva Subramaniam Rajan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/841,913

(22) Filed: Jun. 16, 2022

(65) Prior Publication Data

US 2023/0409423 A1    Dec. 21, 2023

(51) Int. Cl.
| | |
|---|---|
| G06F 11/07 | (2006.01) |
| G06F 11/10 | (2006.01) |
| G06F 11/14 | (2006.01) |
| G06F 11/22 | (2006.01) |
| G06F 11/30 | (2006.01) |

(52) U.S. Cl.
CPC ...... *G06F 11/0772* (2013.01); *G06F 11/0757* (2013.01); *G06F 11/0778* (2013.01); *G06F 11/0787* (2013.01); *G06F 11/1024* (2013.01); *G06F 11/1417* (2013.01); *G06F 11/1441* (2013.01); *G06F 11/2236* (2013.01); *G06F 11/3089* (2013.01); *G06F 11/079* (2013.01)

(58) Field of Classification Search
CPC ............. G06F 11/0772; G06F 11/0757; G06F 11/0778; G06F 11/0787; G06F 11/1024; G06F 11/1417; G06F 11/1441; G06F 11/2236; G06F 11/3089; G06F 11/079
See application file for complete search history.

(56) References Cited

U.S. PATENT DOCUMENTS

| | | | |
|---|---|---|---|
| 10,102,073 B2 * | 10/2018 | Swierk ................. | G06F 21/566 |
| 11,526,411 B2 * | 12/2022 | Chaiken ............... | G06F 11/0772 |
| 2013/0262937 A1 * | 10/2013 | Sridharan ............ | G06F 11/0709 |
| | | | 370/242 |
| 2015/0113334 A1 * | 4/2015 | Raj ....................... | G06F 11/079 |
| | | | 714/45 |
| 2018/0239677 A1 * | 8/2018 | Chen .................... | G06F 11/203 |
| 2018/0322016 A1 * | 11/2018 | Debata ................ | G06F 11/1441 |
| 2019/0278651 A1 * | 9/2019 | Thornley ............. | G06F 11/0787 |
| 2020/0356380 A1 * | 11/2020 | Kelly ................... | G06F 9/44505 |
| 2021/0127161 A1 * | 4/2021 | Silva ................... | H04N 21/44008 |

(Continued)

*Primary Examiner* — Bryce P Bonzo
*Assistant Examiner* — Michael Xu
(74) *Attorney, Agent, or Firm* — Larson Newman, LLP

(57) ABSTRACT

An information handling system includes a processor and an embedded controller. The processor executes operations while the information handling system is in an active power state. The embedded controller communicates with the processor. While the information handling system is in the active power state, the embedded controller detects a trigger event. In response to the trigger event, the embedded controller provides a ping command to the processor. Based on a response to the ping command not being received, the embedded controller determines a processor freeze, stores forensic data associated with the processor freeze, and stores an indication to perform a processor freeze recovery during a next boot operation.

20 Claims, 7 Drawing Sheets

(56) References Cited

U.S. PATENT DOCUMENTS

| | | | |
|---|---|---|---|
| 2021/0232521 A1* | 7/2021 | Kim | G06F 11/1441 |
| 2021/0255939 A1* | 8/2021 | Chaiken | G06F 11/0757 |
| 2022/0269565 A1* | 8/2022 | Chou | G06F 11/1417 |
| 2023/0195512 A1* | 6/2023 | Han | G06F 9/485 |
| | | | 718/102 |

* cited by examiner

COLLECTION OF FORENSIC DATA AFTER A PROCESSOR FREEZE

FIELD OF THE DISCLOSURE

The present disclosure generally relates to information handling systems, and more particularly relates to collection of forensic data after a processor freeze.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a processor that may execute operations while the information handling system is in an active power state. An embedded controller may communicate with the processor. While the information handling system is in the active power state, the embedded controller may detect a trigger event. In response to the trigger event, the embedded controller may provide a ping command to the processor. Based on a response to the ping command not being received, the embedded controller may determine a processor freeze, store forensic data associated with the processor freeze, and store an indication to perform a processor freeze recovery during a next boot operation.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
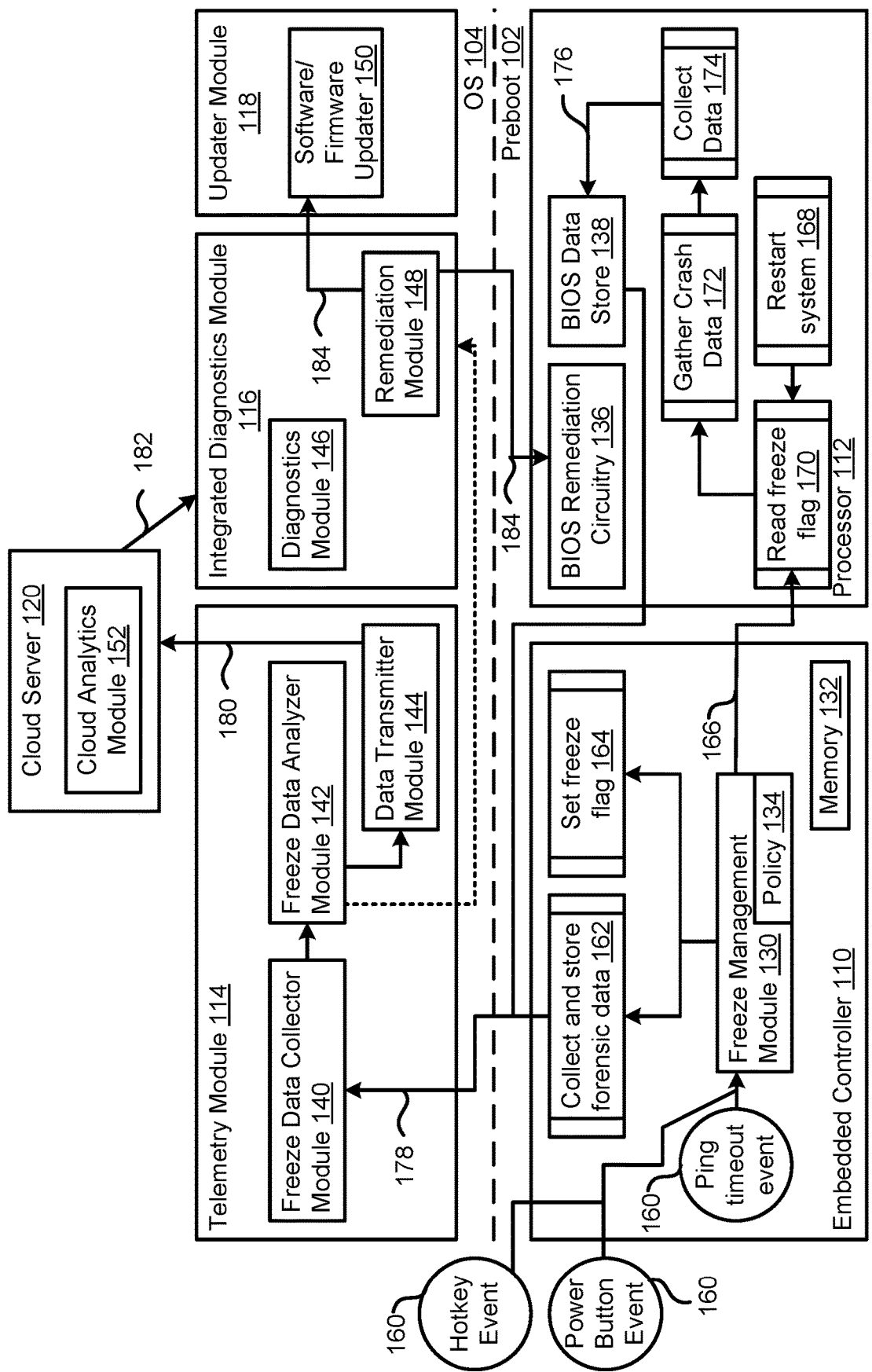
FIG. 1 is a diagram of a portion of an information handling system according to at least one embodiment of the present disclosure.

FIG. 1 shows an information handling system 100 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a pre-boot environment 102 and an operating system (OS) environment 104. Information handling system 100 also includes an embedded controller 110, a processor 112, a telemetry module 114, an integrated diagnostics module 116, and an updater module 118. While different components are illustrated in pre-boot environment 102 and OS environment 104, the components may perform different operations while information handling system 100 is both the pre-boot and OS environments. Embedded controller 110 may be a service processor associated with processor 112. In an example, processor 112 may be a single component or multiple components of information handling system 100. For example, processor 112 may be a main CPU, a chipset, and other subsystems of information handling system 100. Information handling system 100 is in communication with a cloud server 120. Embedded controller 110 includes a freeze management module 130 and a memory 132. Freeze management module 130 includes a policy 132. In an example, policy 132 may be utilized by freeze management module 130 to determine how to handle a detected freeze of processor 112 as will be described herein. Processor 112 includes BIOS remediation circuitry 136 and a BIOS data store 138. Telemetry module 114 includes a freeze data collector module 140, a freeze data analyzer module 142, and a data transmitter module 144. Integrated diagnostics module 116 includes a diagnostics module 146 and a remediation module 148. Updater module 118 includes a software/firmware updater 150. Cloud server 120 includes a cloud analytics module 152.

During operation of information handling system 100, embedded controller 110 may detect a freeze of processor 110 and may immediately collect data associated with the information handling system. Previous information handling systems may have included a reset button to enable a recovery from a processor freeze without removing power. However in these previous information handling systems, embedded controller firmware and the BIOS of the information handling system may not be aware that the reset was to enable a recovery from a processor freeze. In other previous information handling systems, an embedded controller may collect hardware status register values. However, an embedded controller in these previous information handling systems would not be able to get the hardware status register values in the processor is frozen. Information handling system 100 may be improved via embedded controller 110 detecting that processor 112 has frozen. Additionally, embedded controller 110 may collect platform unique data based on the processor freeze and before the status registers are cleared or invalidated by a power off event of information handling system 100. In an example, operations performed by embedded controller 110 to collect critical data in response to a detected processor freeze may improve information handling system 100 by capturing different causes of the issue that led to the processor freeze.

During operation, embedded controller 110 may detect a possible processor freeze of processor 112 based on one of multiple trigger events 160. In an example, trigger events 160 may be any suitable triggers that may cause embedded controller to automatically, semi-automatically, or manually detect a freeze of processor 112. For example, trigger events 160 may include, but are not limited to, a hotkey/combination event, a power button press event, and a ping command timeout event.

In an example, the unique hotkey combination may be any key or combination of keys. For example, the hotkey/combination may include, but is not limited to, a single tap of the power button, a combination of buttons pressed at substantially the same time, and a sequence of taps of keys on the keyboard of the information handling system. In an example, embedded controller 110 may continuously scan keyboard inputs do determine whether a hotkey/combination has been detected. In certain examples, the power button press event may include a determination of whether a power button is pressed for a predetermined amount of time while the information handling system is in an active state. In an example, the predetermined amount of time may any suitable amount of time associated with a forced shutdown of the information handling system, such as four seconds, five seconds, or the like. In certain examples, the ping command timeout event may be determined based on embedded controller 110 not receiving a ping response from multiple ping commands in a row. The ping commands may be CPU platform environment control interface (PECI) ping commands provided over a PECI communication bus between embedded controller 110 and processor 112.

In certain examples, trigger event 160 may be provided to freeze management module 130 of embedded controller 110. In response to the reception of trigger event 160, freeze management module 130 may determine or detect a freeze event of processor 112 based on policy 134 within the freeze management module. In an example, policy 134 may be securely updatable and manageable by an information technology (IT) administrator of information handling system 100. In response to trigger event 160, embedded controller 110 may perform one or more suitable operations to determine that processor 112 is frozen as will be described in detail with respect to FIGS. 2-4 below. Based on a freeze of processor 112, operations 162, 162, 164, 166, 168, 170, 172, 174, 176, 178, 180, 182, 184, and 186 may be performed to collect and analyze forensic data associated with the processor freeze.

In response to a determination or detection that processor 112 is frozen, embedded controller 110 may collect and store forensic data in memory 132 at operation 162. In certain examples, memory 132 may be any suitable type of memory including, but not limited to, a non-volatile random-access memory (NVRAM) that is controlled by embedded controller 110. In certain examples, the forensic data may be any suitable data associated with the information handling system when the processor freeze was detected including, but not limited to, temperatures, fan speeds, battery charge/discharge rate, processor PECI states, and lid states. In an example, freeze management module 130 may set a freeze flag in memory 132 at operation 164. In an example the freeze flag may be an embedded controller NVRAM flag.

In response to the freeze flag being set, embedded controller 110 may reset processor 112 at operation 166. In an example, the reset of processor 112 may be only a CPU reset and not a complete system reset. At operation 168, information handling system 100 may come out of the processor reset. The BIOS of processor 112 may then read NVRAM flags in memory 132 to determine whether the freeze flag is set at operation 170. In response to the freeze flag being set, the BIOS may gather crash data at operation 172. In an example, the crash data may be any suitable data information handling system 100 typically collects during a crash event.

The BIOS may then collect different data associated with status registers of information handling system 100 at operation 174. In an example, the data collected by the BIOS may include subsystem status registers using a BIOS-IQ framework. In certain examples, the status registers may be any suitable registers, such as management module status registers, chipset registers, or the like. The data in these registers, such as registers in memory 132, may be reset or cleared during a full system reboot. In an example, during the CPU freeze recovery BIOS boot, the BIOS may skip clearing the CPU/chipset/device error statuses. Additionally, the BIOS may skip initializing processor 112 because the initialization is not needed during a processor reset. The BIOS may also write the forensic data associated with the processor freeze to variable in memory 132 so that the forensic data may be available to send to cloud server 120 as will be described below.

The BIOS may store the collected data in BIOS data store 138 at operation 176. In an example, the data stored within BIOS data store 138 may remain after processor 112 is reset and may be utilized during pre-boot 102 operations of information handling system 100. Processor 112 may be rebooted, and after OS 104 has been loaded, freeze data collector module 140 of telemetry module 114 may pull the forensic data from memory 132 of embedded controller 110 and the register status data from BIOS data store 138. In response to receiving the data in telemetry module 114, freeze data analyzer module 144 may analyze the collected freeze data, and data transmitter module 144 may provide the analyzed data to cloud analytics module 152 of cloud server 120.

Cloud analytics module 152 may utilize the analyzed data to select or determine remediation/mitigation operations for the freeze of processor 112. In an example, cloud analytics module 152 may include machine learning (ML)/artificial intelligence (AI) code to examine the analyzed data and based on the analyzed data determine remediation/mitigation operations. In certain examples, freeze data analyzer module 142 may determine the remediation/mitigation operations without sending the data to cloud analytics module 152. In an example, the remediation/mitigation operations may include, but is not limited to, a firmware configuration change, a firmware update, and a power state disable. Cloud server 120 may provide the remediation/mitigation operations to diagnostics module 116 and remediation module 148 of integrated diagnostics module 116 at operation 182. At operation 184, remediation module 148 may cause the received remediation/mitigation operations to be applied within information handling system 100. In an example, the remediation/mitigation operations may be applied by software/firmware updater 150 of updater module 118, or via BIOS remediation circuitry 136.

Figure 2:
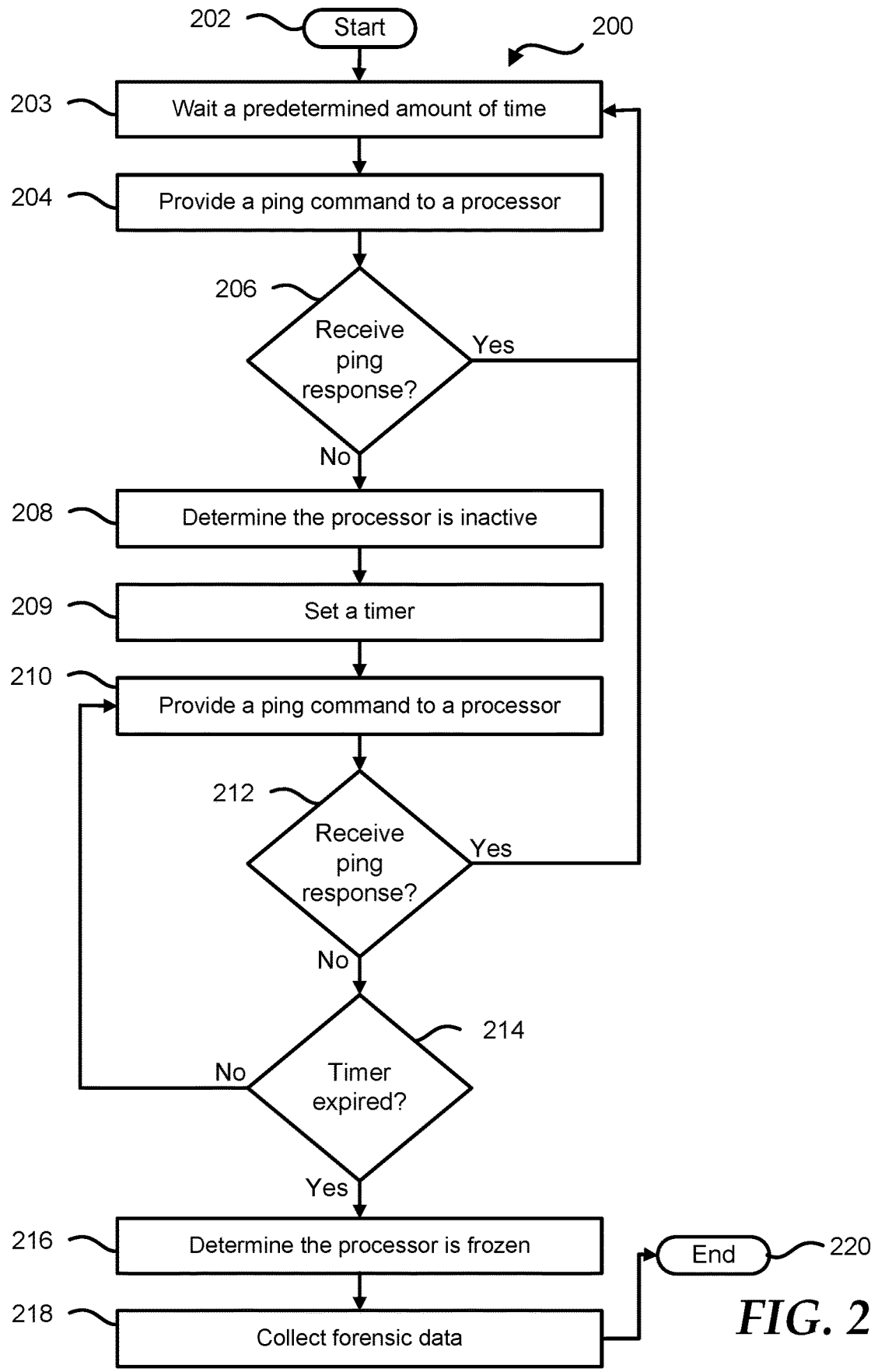
FIG. 2 is a flow diagram of a method for detecting a system freeze according to at least one embodiment of the present disclosure.

FIG. 2 illustrates a method 200 for detecting a system freeze according to at least one embodiment of the present disclosure, starting at block 202. In an example, the method 200 may be performed by any suitable component including, but not limited to, embedded controller 110 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 203, a predetermined amount of time is waited before a ping command is sent. In an example, the predetermined amount of time may be any suitable amount of time set by an IT administrator of the information handling system, such as 10 seconds, 12 seconds, 15 seconds, 16 seconds, or the like. At block 204, a ping command is provided to a processor of the information handling system. In an example, the ping command may be any suitable command, such as a CPU PECI ping command, which may be utilized to detect if a processor is active. At block 206, a determination is made whether a ping response has been received. If a ping response is received, the flow continues at block 203. In an example, the ping commands may be periodically provided by the embedded controller to the processor. If a ping response is not received, the processor is determined to be inactive at block 208. After the processor is determined to be inactive, a timer is set at block 209. At block 210, another ping command is provided to the processor. At block 212, a determination is made whether a ping response has been received. If a ping response is received, the flow continues at block 203. If a ping response is not received, a determination is made whether a timer has expired at block 214. In an example, a length of the timer may be any suitable length of time including, but not limited to, a length of time shorter than a forced shutdown, such as four seconds.

If the timer has not expired, the flow continues as stated above at block 212 and another ping command is provided to the processor. If the timer has expired, a determination is made that the processor is frozen at block 216. At block 218, forensic data for the information handling system is collected and the flow ends at block 220. In an example, the operations of method 200 may enable an embedded controller to create a processor and chipset reset before the information handling system shutdown occurs.

Figure 3:
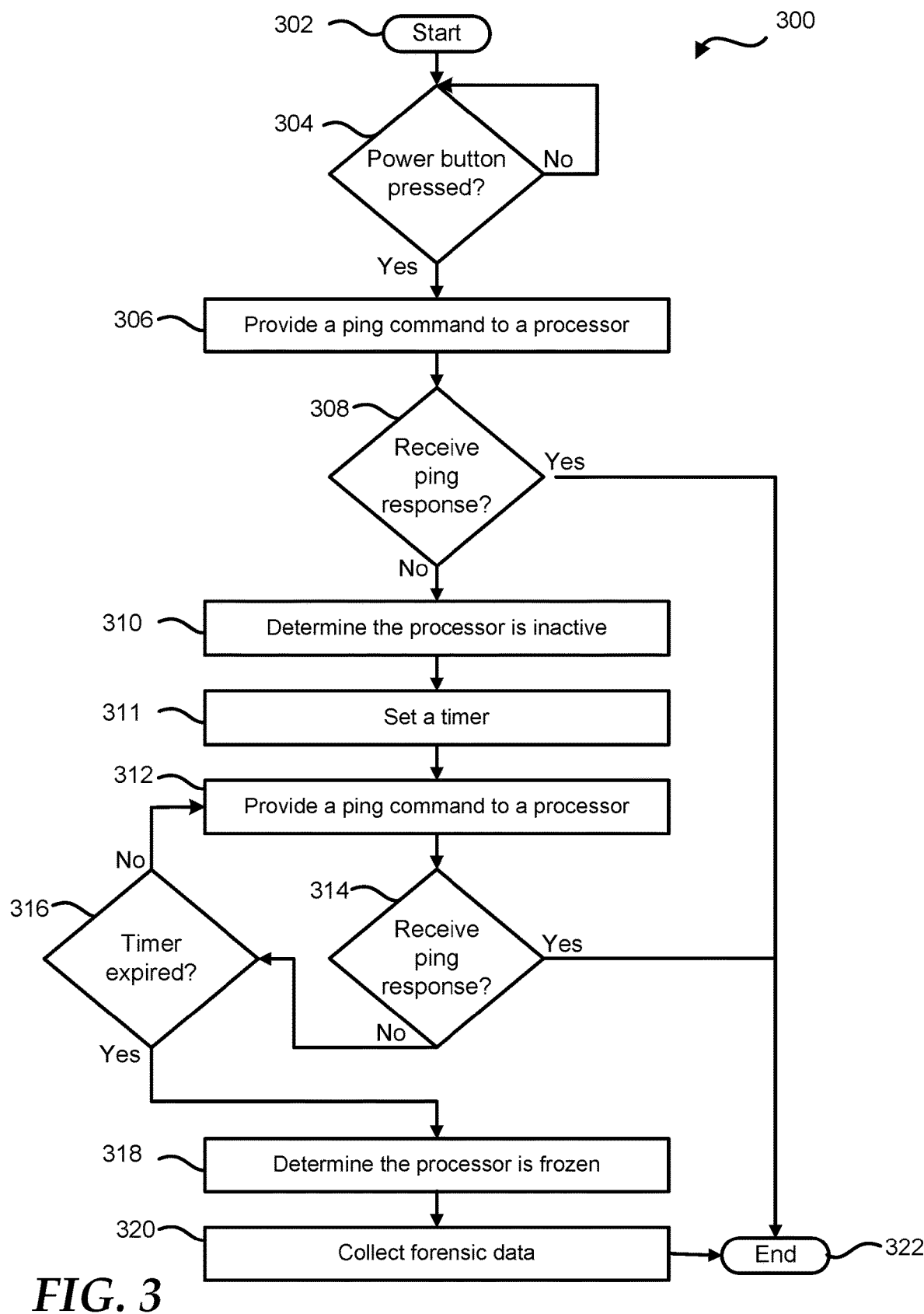
FIG. 3 is a flow diagram of another method for detecting a system freeze according to at least one embodiment of the present disclosure.

FIG. 3 illustrates a method 300 for detecting a system freeze according to at least one embodiment of the present disclosure, starting at block 302. In an example, the method 300 may be performed by any suitable component including, but not limited to, embedded controller 110 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 304, a determination is made whether a power button is pressed for a predetermined amount of time while the information handling system is in an active state. In an example, the predetermined amount of time may any suitable amount of time associated with a forced shutdown of the information handling system, such as four seconds, five seconds, or the like. In response to the power button being pressed for the predetermined amount of time, a ping command is provided to a processor of the information handling system at block 306. In an example, the ping command may be any suitable command, such as a CPU PECI ping command, which may be utilized to detect if a processor is active.

At block 308, a determination is made whether a ping response has been received. If a ping response is received, the flow ends at block 322. If a ping response is not received, the processor is determined to be inactive at block 310. After the processor is determined to be inactive, a timer is set at block 311. Another ping command is provided to the processor at block 312. At block 314, a determination is made whether a ping response has been received. If a ping response is received, the flow ends at block 322. If a ping response is not received, a determination is made whether a timer has expired at block 316. In an example, a length of the timer may be any suitable length of time including, but not limited to, a length of time associated with a forced shutdown, such as four seconds.

If the timer has not expired, the flow continues as stated above at block 312 and another ping command is provided to the processor. If the timer has expired, a determination is made that the processor is frozen at block 318. At block 320, forensic data for the information handling system is collected and the flow ends at block 322. In an example, the operations of method 300 may enable an embedded controller to create a processor and chipset reset before the information handling system shutdown occurs.

Figure 4:
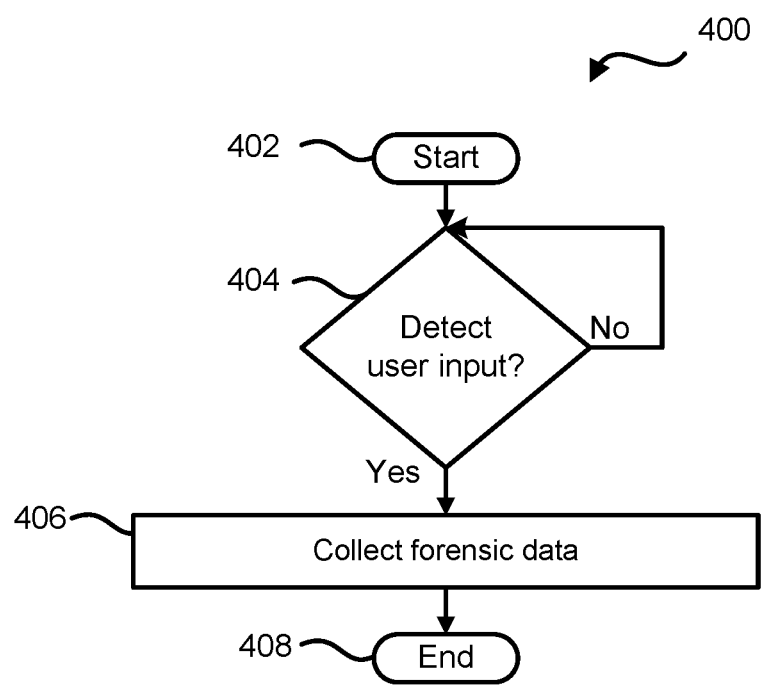
FIG. 4 is a flow diagram of another method for detecting a system freeze according to at least one embodiment of the present disclosure.

FIG. 4 illustrates a method 400 for detecting a system freeze according to at least one embodiment of the present disclosure, starting at block 402. In an example, the method 400 may be performed by any suitable component including, but not limited to, embedded controller 110 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 404, a determination is made whether a unique hotkey/combination has been pressed. In an example, the unique hotkey combination may be any key or combination of keys. For example, the hotkey/combination may include, but is not limited to, a single tap of the power button, a combination of buttons pressed at substantially the same time, and a sequence of taps of keys on the keyboard of the information handling system. In an example, the embedded controller of the information handling system may continuously scan keyboard inputs do determine whether a hotkey/combination has been detected.

In response to the hotkey/combination being detected, forensic data for the information handling system is collected at block 406 and the flow ends at block 408. In this example, the hotkey/combination may be utilized to cause the embedded controller to collect forensic data without first determining whether the processor is frozen. For example, the flow of method 400 may be performed both when the processor is frozen and when the processor is not frozen, but the OS is unresponsive.

Figure 5:
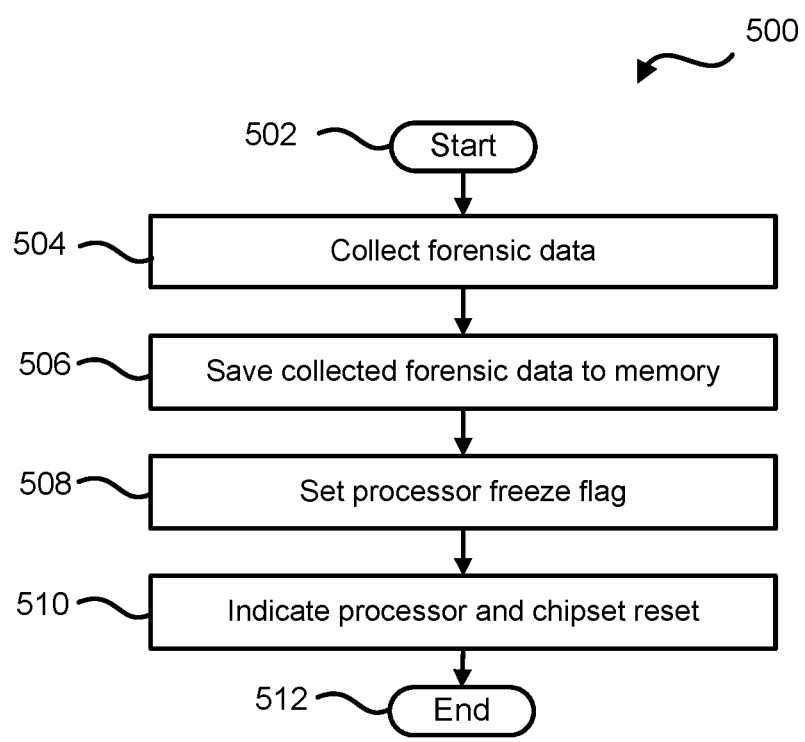
FIG. 5 is a flow diagram of a method for collecting forensic data according to at least one embodiment of the present disclosure.

FIG. 5 illustrates a method 500 for collecting forensic data according to at least one embodiment of the present disclosure, starting at block 502. In an example, the method 500 may be performed by any suitable component including, but not limited to, embedded controller 110 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 504, embedded controller forensic data is collected. In an example, this data may be collected after a processor freeze state has been detected. In certain examples, the forensic data may be any suitable data associated with the information handling system when the processor freeze was detected including, but not limited to, temperatures, fan speeds, battery charge/discharge rate, processor PECI states, and lid states.

At block 506, the collected forensic data is stored in a memory, such as a NVRAM of the embedded controller. In an example, this NVRAM may be controlled by the embedded controller, such that other processors in the information handling system may not have write permissions to the NVRAM of the embedded controller. At block 508, a processor freeze flag is set. In certain examples, the processor freeze flag may be any flag within the NVRAM of the embedded controller to indicate that a processor freeze recovery operation is to be performed during a next BIOS boot operation of the information handling system. The flag may be set by any suitable component of the embedded controller, such as a flash controller of the embedded controller.

At block 510, a processor and chipset reset is indicated. In an example, the reset indication may be given by the embedded controller toggling a platform reset signal to only perform a processor and chipset reset not an entire platform reset, and the flow ends at block 512. In certain examples, during early phases of a system boot, the BIOS may request the boot flag from the embedded controller. In these examples, the boot flag in the NVRAM of the embedded controller may report or indicate that a processor freeze recovery should be performed by the BIOS. In an example, after the processor freeze recovery has been completed, the processor freeze flag of the NVRAM of the embedded controller may be cleared.

Figure 6:
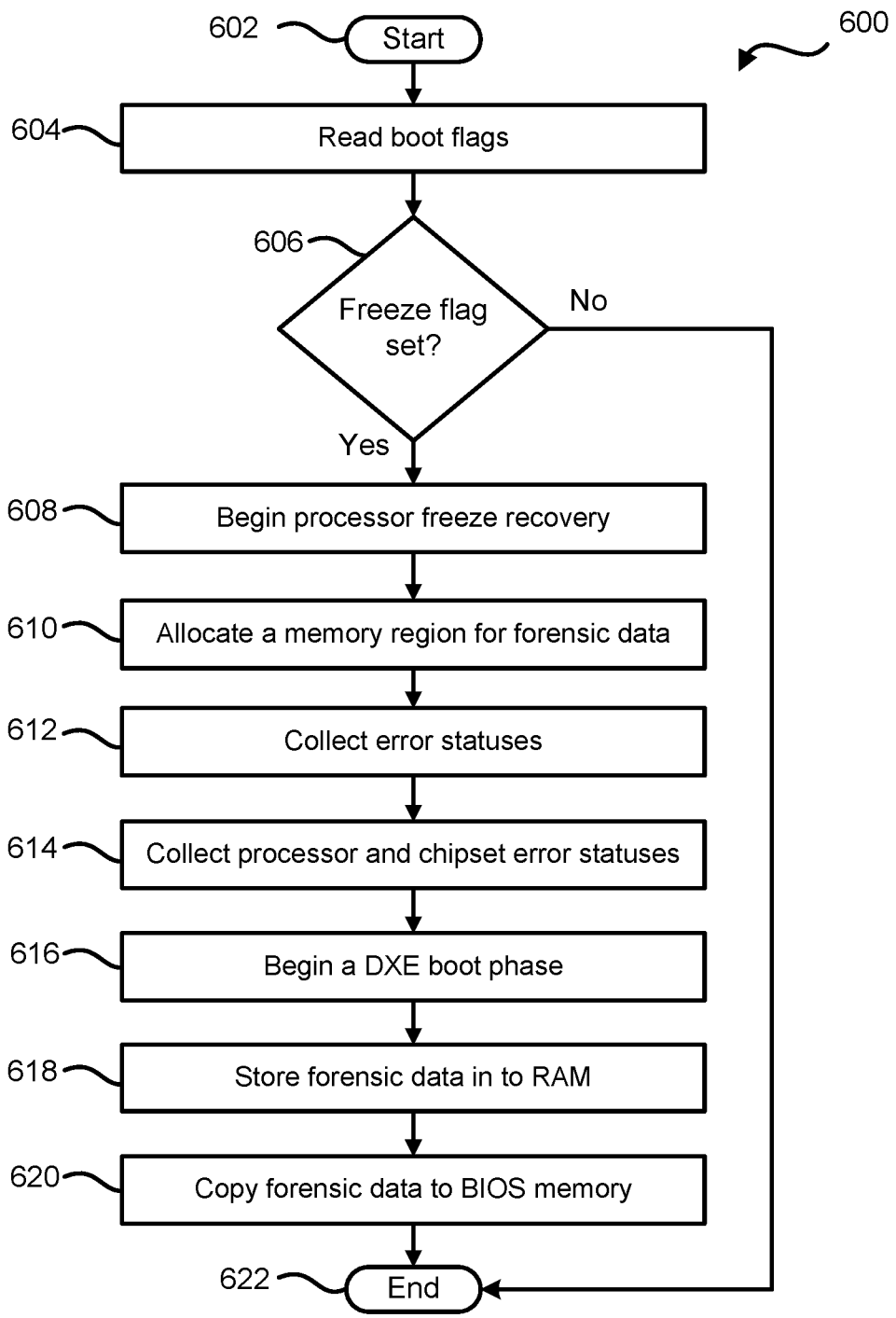
FIG. 6 is a flow diagram of another method for collecting forensic data according to at least one embodiment of the present disclosure.

FIG. 6 illustrates a method 600 for collecting forensic data according to at least one embodiment of the present disclosure, starting at block 602. In an example, the method 600 may be performed by any suitable component including, but not limited to, processor 112 of FIG. 1 and processor 702 or 704 of FIG. 7. It will be readily appreciated that not every method step set forth in this flow diagram is always necessary, and that certain steps of the methods may be combined, performed simultaneously, in a different order, or perhaps omitted, without varying from the scope of the disclosure.

At block 604, boot flags are read. In an example, the boot flags may be read during an early BIOS boot phase. For example, the flags may be read before the BIOS initializes hardware configuration, clear hardware statuses, or the like. In an example, the BIOS may read the flags via any suitable interface available to the BIOS. At block 606, a determination is made whether a processor freeze flag has been set. If the processor freeze flag has not been set, the flow ends at block 622.

If the processor freeze flag has been set, a processor freeze recovery is begun at block 608. In an example, the processor freeze recovery may be initiated via any suitable operation. For example, a BIOS flag, such as CPU FREEZE RECOVERY may be set to indicate that the BIOS is to perform the processor freeze recovery operations. At block 610, a memory region with a BIOS memory is allocated for the storage of collect forensic data. In an example, the BIOS memory may be any suitable memory accessible by the BIOS, such as a UEFI BIOS hand-off-block (HOB) memory. In certain examples, one or more applications, such as a crash log, may collect data associated with a crash of an information handling system. In this example, if data is stored by these one or more applications, the BIOS may read this collected data.

At block 612, error statuses are collected. In an example, the error statuses may be associated with components of the information handling system, such as PCIE bridges, devices, or the like. At block 614, processor and chipset error statuses are collected. In certain examples, the error statuses may be any suitable data associated with errors, if any, that occurred in the corresponding components. For example, an error status associated with the processor or chipset may be a global reset cause.

At block 616, a DXE boot phase is begun. At block 618, the collected forensic data may be stored in a random-access memory (RAM). In an example, the collected forensic data from be read from a memory of the embedded controller and stored in a BIOS NVRAM. At block 620, the forensic data may be written from the BIOS NVRAM to the allocated memory region of the UEFI HOB memory, and the flow ends at block 622. While the transfer of the collected forensic data has been described with respect to storing the collected data in the BIOS NVRAM, the collected forensic data may be read from the memory of the embedded controller and stored in the UEFI HOB memory without varying from the scope of this disclosure.

Figure 7:
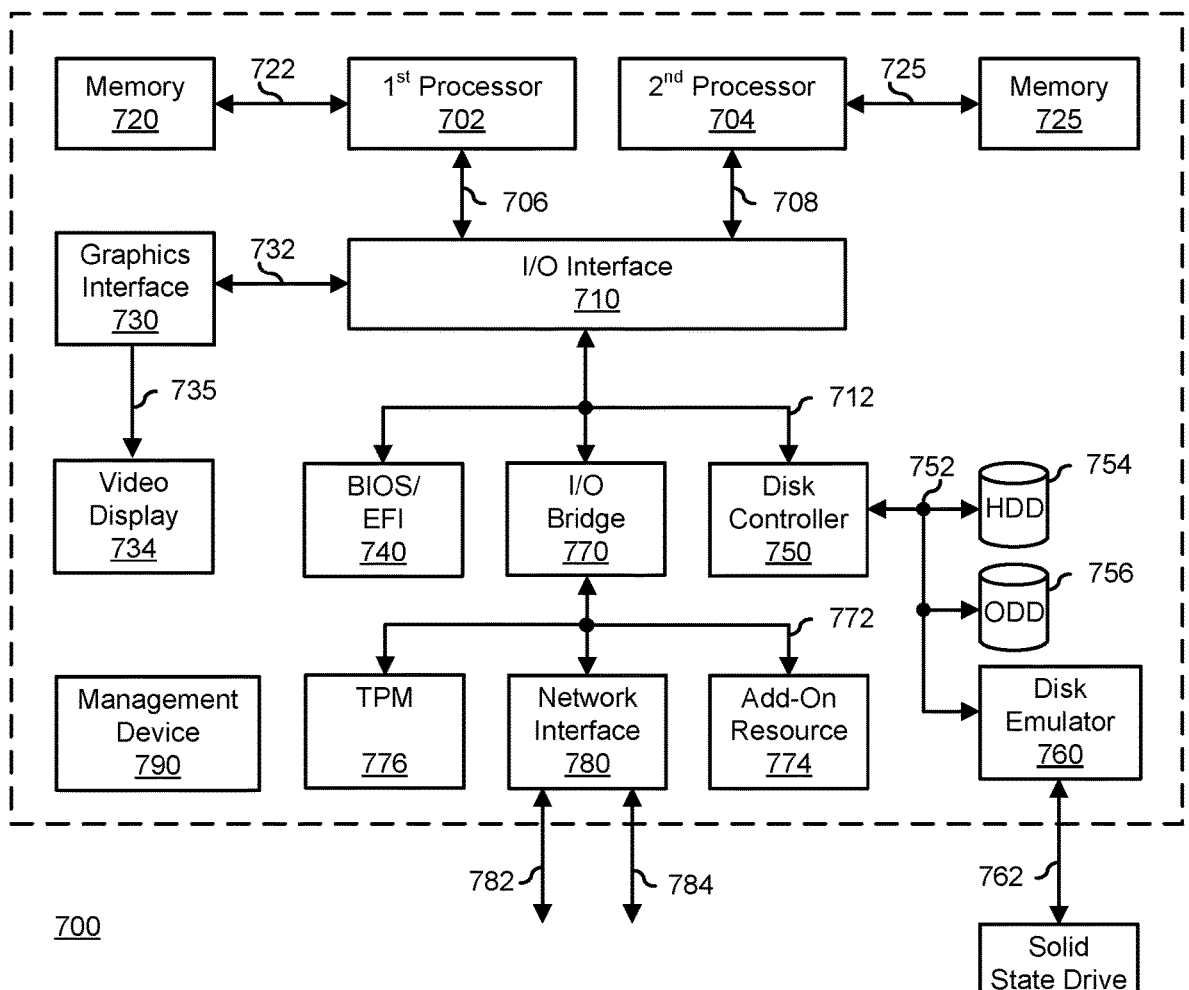
FIG. 7 is a block diagram of a general information handling system according to an embodiment of the present disclosure.

FIG. 7 illustrates a generalized embodiment of an information handling system 700. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below and operates to perform one or more of the methods described below. Information handling system 700 includes a processors 702 and 704, an input/output (I/O) interface 710, memories 720 and 725, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 762, an I/O bridge 770, one or more add-on resources 774, a trusted platform module (TPM) 776, a network interface 780, a management device 790, and a power supply 795. Processors 702 and 704, I/O interface 710, memory 720, graphics interface 730, BIOS/UEFI module 740, disk controller 750, HDD 754, ODD 756, disk emulator 760, SSD 762, I/O bridge 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to I/O interface 710 via processor interface 706, and processor 704 is connected to the I/O interface via processor interface 708. Memory 720 is connected to processor 702 via a memory interface 722. Memory 725 is connected to processor 704 via a memory interface 727. Graphics interface 730 is connected to I/O interface 710 via a graphics interface 732 and provides a video display output 736 to a video display 734. In a particular embodiment, information handling system 700 includes separate memories that are dedicated to each of processors 702 and 704 via separate memory interfaces. An example of memories 720 and 730 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O bridge 770 are connected to I/O interface 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 710 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O bridge 770 includes a peripheral interface 772 that connects the I/O bridge to add-on resource 774, to TPM 776, and to network interface 780. Peripheral interface 772 can be the same type of interface as I/O channel 712 or can be a different type of interface. As such, I/O bridge 770 extends the capacity of I/O channel 712 when peripheral interface 772 and the I/O channel are of the same type, and the I/O bridge translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as I/O interface 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700.

Management device 790 can operate off of a separate power plane from the components of the host environment so that the management device receives power to manage information handling system 700 when the information handling system is otherwise shut down. An example of management device 790 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 790 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
   a processor to execute operations while the information handling system is in an active power state;
   an embedded controller configured to communicate with the processor, the embedded controller to:
   detect a trigger event;
   in response to the trigger event, provide a ping command to the processor; and
   based on a response to the ping command not being received, the embedded controller to:
   determine a processor freeze;
   in response to the processor freeze, allocate a memory region within a basic input/output system (BIOS) memory for forensic data associated with the processor freeze;
   store the forensic data associated with the processor freeze in the allocated memory region; and
   store an indication to perform a processor freeze recovery during a next boot operation, wherein the next boot is a processor freeze recovery boot; and
   a BIOS configured to communicate with the embedded controller and with the processor, during the processor freeze recovery boot the BIOS to:
   skip an initializing of the processor; and
   skip a clearing of error register statuses in the allocated memory region with the BIOS memory.

2. The information handling system of claim 1, further comprising a memory within the embedded controller, the embedded controller further to set a freeze flag within the memory to store the indication to perform the processor freeze recovery.

3. The information handling system of claim 1, wherein the embedded controller further to toggle a platform reset signal, wherein the toggled platform reset signal starts a restart of the processor.

4. The information handling system of claim 1, wherein the BIOS is configured to communicate with the embedded controller, the BIOS to:
   read the indication to perform the processor freeze recovery; and
   write the forensic data to memory variables for access by a cloud server.

5. The information handling system of claim 4, wherein the BIOS further to read the error register statuses without deleting the error register statuses.

6. The information handling system of claim 1, wherein the trigger event is a power button of the information handling system being pressed for a predetermined amount of time.

7. The information handling system of claim 1, wherein the trigger event is a detection of a hotkey/combination input on a keyboard of the information handling system.

8. The information handling system of claim 1, wherein the trigger event is a determination that a plurality of periodic ping commands are not associated with a plurality of ping responses.

9. A method comprising:
   detecting, by an embedded controller of an information handling system, a trigger event associated with an inactive state of a processor of the information handling system;
   in response to the trigger event, providing, by the embedded controller, a ping command to the processor;
   based on a response to the ping command not being received:
   determining a processor freeze;
   in response to the processor freeze, allocating a memory region within a basic input/output system (BIOS) memory for forensic data associated with the processor freeze;

storing the forensic data associated with the processor freeze in the allocated memory region; and storing an indication to perform a processor freeze recovery during a next boot operation, wherein the next boot is a processor freeze recovery boot; and during the processor freeze recovery boot:

skipping, by a BIOS, an initializing of the processor; and skipping, by the BIOS, a clearing of error register statuses in the allocated memory region with the BIOS memory.

10. The method of claim 9, further comprising setting a freeze flag within a memory to store the indication to perform the processor freeze recovery.

11. The method of claim 9, further comprising toggling a platform reset signal, wherein the toggled platform reset signal starts a restart of the processor.

12. The method of claim 9, further comprising:

reading, by the BIOS, the indication to perform the processor freeze recovery; and writing, by the BIOS, the forensic data to memory variables for access by a cloud server.

13. The method of claim 12, further comprising reading, by the BIOS, the error register statuses without deleting the error register statuses.

14. The method of claim 9, wherein the trigger event is a power button of the information handling system being pressed for a predetermined amount of time.

15. The method of claim 9, wherein the trigger event is a detection of a hotkey/combination input on a keyboard of the information handling system.

16. The method of claim 9, wherein the trigger event is a determination that a plurality of periodic ping commands are not associated with a plurality of ping responses.

17. An information handling system comprising:

a processor to execute operations while the information handling system is in an active power state;

an embedded controller configured to communicate with the processor, the embedded controller to:

in response to a trigger event, provide a ping command to the processor; and based on a response to the ping command not being received:

determine a processor freeze;

in response to the processor freeze, allocate a memory region within a basic input/output system (BIOS) memory for forensic data associated with the processor freeze;

store the forensic data associated with the processor freeze in the allocated memory region;

store an indication to perform a processor freeze recovery during a next boot operation; and toggle a platform reset signal, wherein the toggled platform reset signal starts a restart of the processor, wherein the next boot is a processor freeze recovery boot; and a BIOS configured to communicate with the embedded controller and with the processor, during the processor freeze recovery boot, the BIOS to:

skip an initializing of the processor;

skip a clearing of error register statuses in the allocated memory region with the BIOS memory;

read the indication to perform the processor freeze recovery; and write the forensic data to memory variables for access by a cloud server.

18. The information handling system of claim 17, further comprising a memory within the embedded controller, the embedded controller further to set a freeze flag within the memory to store the indication to perform the processor freeze recovery.

19. The information handling system of claim 17, wherein the BIOS further to read the error register statuses without deleting the error register statuses.

20. The information handling system of claim 17, wherein the trigger event is a power button of the information handling system being pressed for a predetermined amount of time.

* * * * *